Oct. 8, 1946.  L. J. DALE  2,409,021
PIE DOUGH FORMER, TRIMMER, AND CRIMPER
Filed July 28, 1943  4 Sheets-Sheet 1

Inventor
Lorina J. Dale

By Clarence A. O'Brien
and Harvey B. Jacobson
Attorneys

Oct. 8, 1946.                L. J. DALE                2,409,021
            PIE DOUGH FORMER, TRIMMER, AND CRIMPER
               Filed July 28, 1943        4 Sheets-Sheet 2
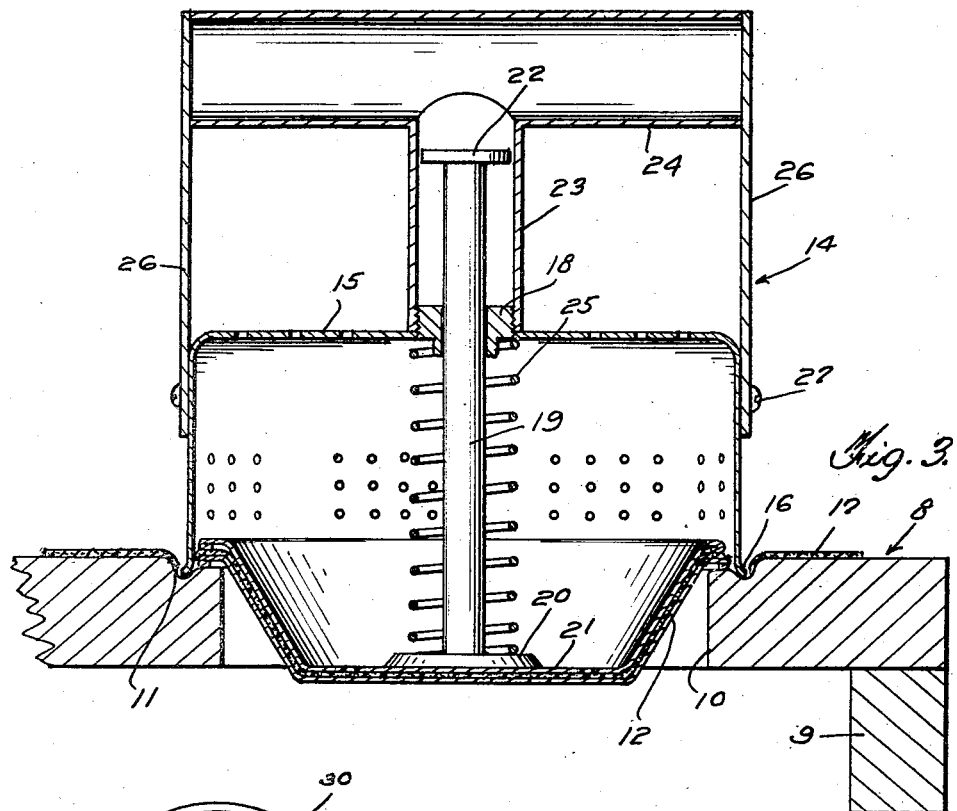
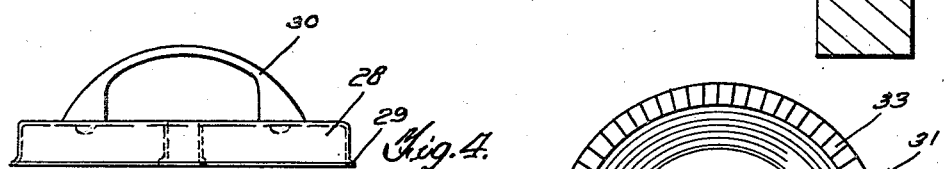
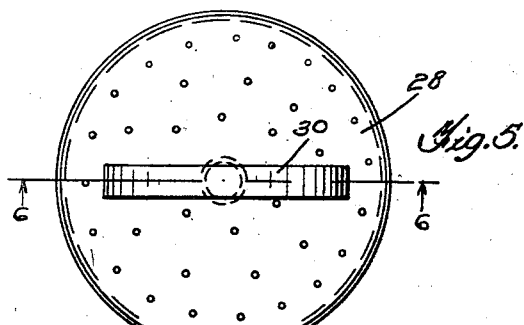
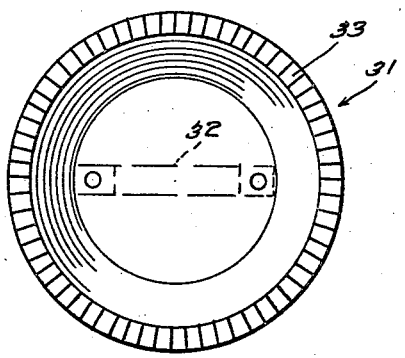
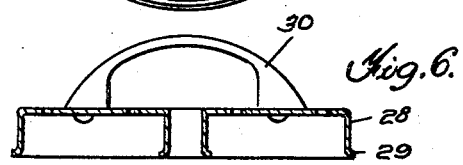
Inventor
Loring J. Dale
By Clarence A. O'Brien
and Harvey B. Jacobson
Attorneys

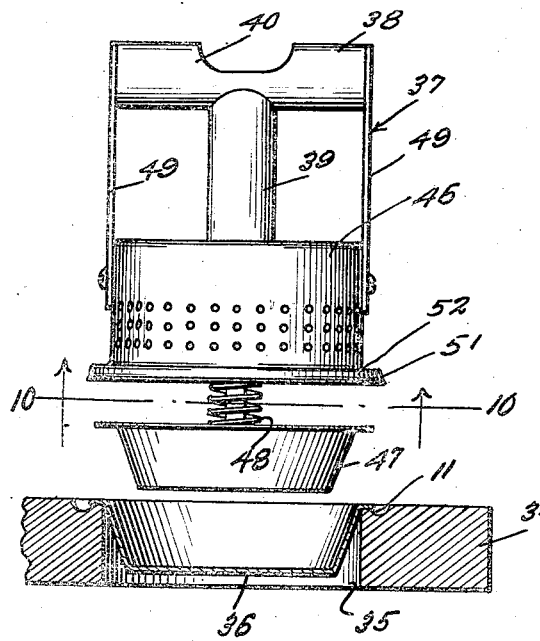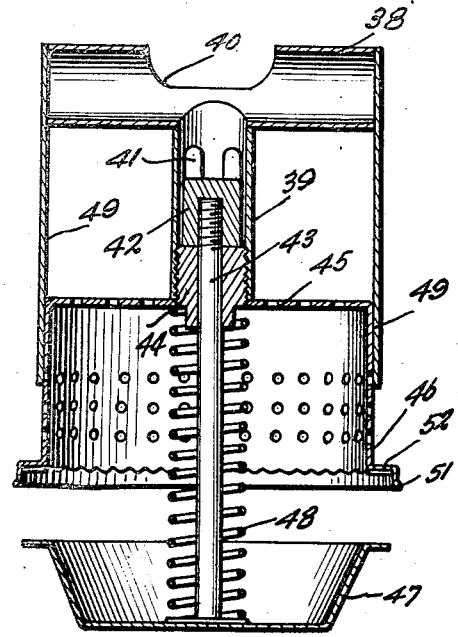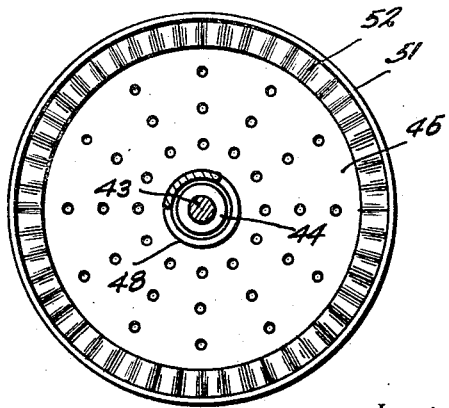

Oct. 8, 1946.  L. J. DALE  2,409,021
PIE DOUGH FORMER, TRIMMER, AND CRIMPER
Filed July 28, 1943  4 Sheets-Sheet 4
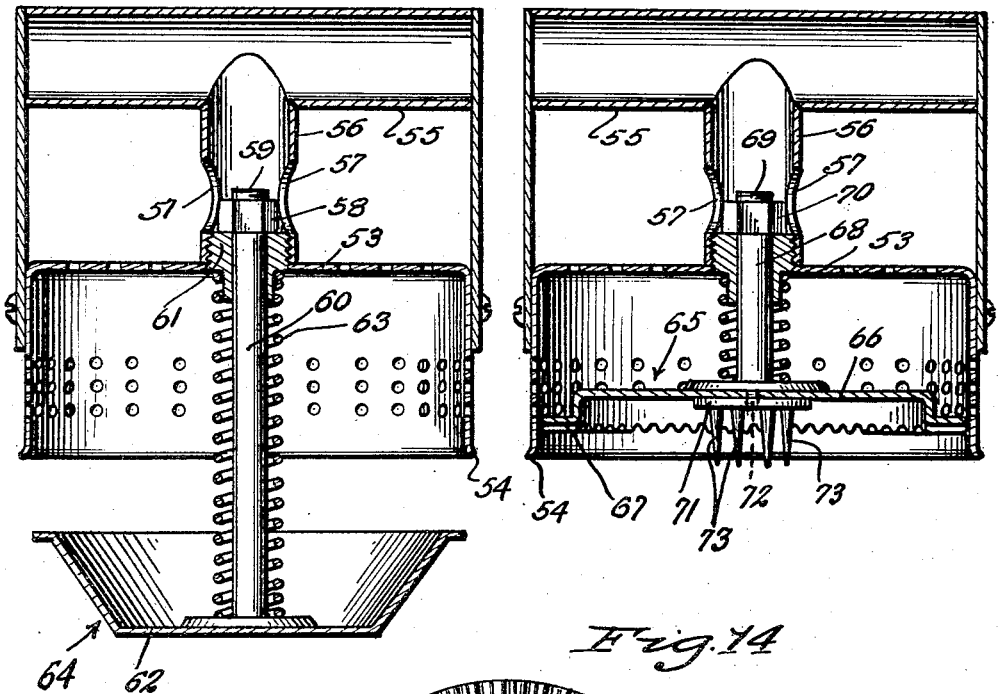
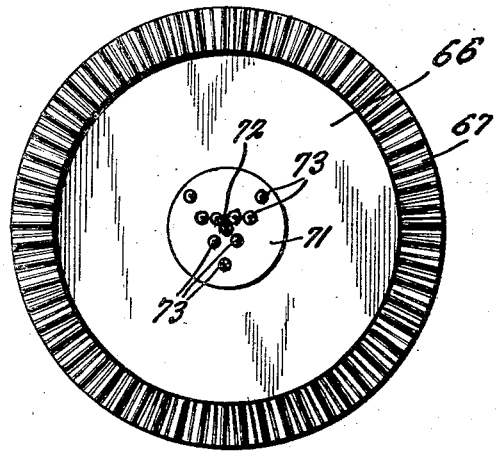
Inventor
Loring J. Dale
By Clarence A. O'Brien
and Harvey B. Jackson, Attorneys Patented Oct. 8, 1946

2,409,021

UNITED STATES PATENT OFFICE 2,409,021

PIE DOUGH FORMER, TRIMMER, AND CRIMPER

Loring J. Dale, Phoenix, Ariz.

Application July 28, 1943, Serial No. 496,468

7 Claims. (Cl. 107—49)

This invention relates to a novel and improved structural assemblage embodying a dough mold or former, a trimmer and crimper, the structure as a whole being adapted to expedite making pies of any size, large, small or individual, fruit or meat pies. This arrangement is of great advantage when used in restaurants, small bakeries, or home use and may be easily adapted for other use. Further the basic arrangement if used in multiple series is suitable for incorporation in large pie machines making larger quantities of pies. The invention is adaptable to all sizes of pies.

I am aware that many different types of pie making devices have been described and used and that various styles of dough cutters, pie edge crimpers and the like are old and well known. The chief novelty of my new assemblage resides in an especially constructed tin supporting base and a combination dough shaper or former and trimmer means expressly designed for coaction therewith.

More specifically, one object of the invention consists in providing a trimmer-crimper unit, characterized by simplicity and durability which is susceptible of being manufactured by mass production.

Another object of the invention is to provide a simple and economical base for supporting one or more pie tins, the base being especially recessed to accomplish advantages hereinafter more specifically described.

A further object of the invention consists in providing a simple and economical base for the pie tins, in the form of a simple board having openings formed therein for reception of said pie tins, the depth of the opening being greater than the depth of the tins.

A further object is the provision of a novel unit characterized by a handle-equipped, cup-like trimmer, the latter having incorporated therein a crimper, said unit also including a detachable former capable of being connected and disconnected alternately with the said crimper.

Other features and advantages will become more fully readily apparent from the following description and the accompanying illustrative drawings.

Figure 3 is an enlarged central, vertical, sectional view on the plane of the line 3—3 of Figure 2, looking in the direction of the arrows.

Figures 4 and 5 are edge and plan views of a simple type dough cutter, this being used for cutting out the pie tops.

Figure 6 is a section on the line 6—6 of Figure 5.

Figure 7 is a bottom plan view of a simple inverted cup-type crimper.

Figure 8 is an elevational and sectional view of a modified form of the invention, this disclosing the aforementioned simple base and the triple-part unit embodying a former, and "two-way" trimmer and crimper device.

Figure 9 is an enlarged sectional and elevational view of the aforementioned triple-part former, crimper and trimmer unit.

Figure 10 is a section on the plane of the line 10—10 of Figure 8, looking in the direction of the arrows.

Figure 11 is a perspective view of one of the details also appearing in Figure 9.

Figure 12 is a modification showing a duplex or dual unit comprising a trimmer or cutter unit and a detachable interchangeable former.

Figure 13 is a view like Figure 12 with the former removed and the interchangeable crimper unit or device substituted therefor.

Figure 14 is a bottom plan view of the structure shown in Figure 13.

Figures 1, 2:
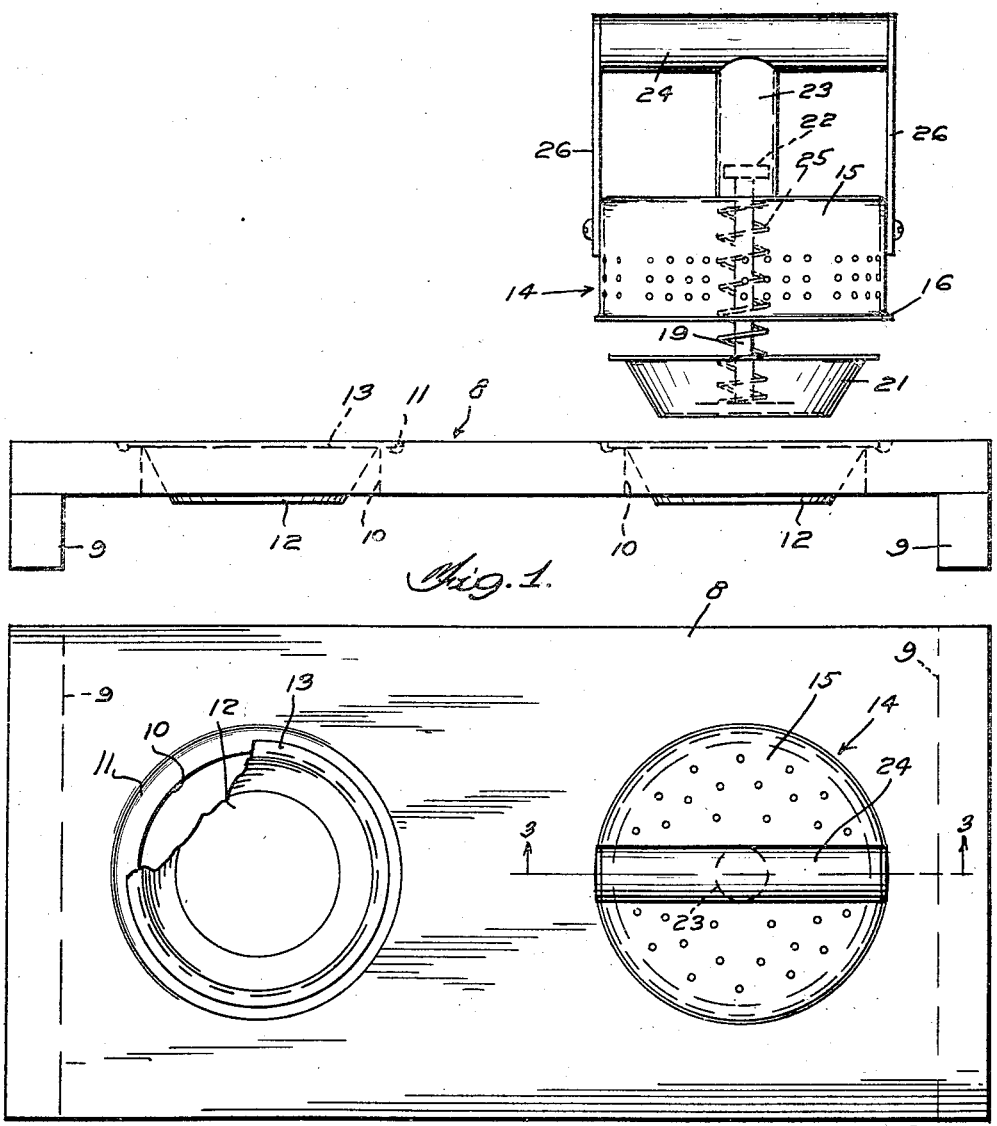
Figure 1 is an elevation of the improved base with the pie plates or tins in position, there being shown in association therewith the double acting combination pie dough former and trimmer unit.
Figure 2 is a top plan view of the assemblage seen in Figure 1 with the pie tin at the left broken away to show the construction of the base therebeneath.

The invention hereinafter described comprises several modifications, one of which is shown in Figures 1 to 7, inclusive.

In this modification one form of the base, as a unit, is designated by the numeral 8. It comprises a rectangular board having block-like supports 9 of a height sufficient to support the board above the table or other support (not shown). This board is formed at predetermined points with openings 10 and the upper surface of the board surrounding each opening is provided with a countersunk, annular depression 11 constituting a trimmer accommodation ledge.

The pie tin, or so-called plate, is denoted by the numeral 12 and is of predetermined depth and diameter and includes the customary lip or rim 13 which rests upon the ledge 11. There is sufficient clearance between the edge of the shoulder surrounding the ledge to provide clearance for the trimmer.

The former and the trimmer unit of Figures 1 to 3, inclusive, is generally denoted by the numeral 14. The construction of this device is brought out best in Figure 3. The structure comprises an inverted cylindrical cup 15 having suitable ventilating apertures therein. The lower edge of the wall of the cup is flared and fashioned into a cutting edge. This is the trimmer and is adapted to cut off the surplus dough 17, as shown in Figure 3. In the central crown portion of the so-called cup 15 is a guide and assembling collar nut 18 through which the plunger or pin 19 projects and is slidable. The lower end of the pin, as at 20, is anchored in a pan-like former or shaping mold 21. This corresponds in shape and dimension to the pie tin and is adapted to seat itself in the tin as shown in Figure 3 of the drawings. In this preferred form the former element is preferably a replica or duplicate of the pie tin. However, it may be otherwise constructed and still perform the desired results.

The plunger 19 passes through the guide collar and has a head 22 on its upper end slidable in the tubular portion 23 of a T-shaped hand grip or handle 24. It will be noted that the stem 23 is internally threaded at its lower end and threadedly connected with the nut-like guide 18. Also this guide serves as an abutment for one end of a coil spring 25 which surrounds the plunger stem 19. The spring bears at its lower end against the anchoring element 20 and at its upper end against the guide and assembling collar or nut 18. For stability a pair of arms 26, are fastened at 27 to diametrically opposite points on the wall of the cup 15. The upper ends are connected with the adjacent outer ends of the hand grip 24. Thus, the cup 15 is firmly braced and attached to the T-shaped handle.

The spring 25 normally projects the former or mold 21 to a point outwardly beyond the cutting or trimmer edge 16. Therefore, after the dough is cut out and placed in the pie tin, it is first pressed down to conform to the shape of the pie tin, by pressure of the former 21 against it. By exerting further pressure on the handle 24 the trimmer comes down and clips the surplus dough 17 as shown in Figure 3. This double progressive action of the parts 21 and 16 is of particular advantage.

Figures 4 to 6, inclusive, illustrate a dough cutter 28 having a cutting lip or edge 29 provided with a suitable handle 30. A simple, individual type crimper 31 shown in Figure 7 consists of an inverted shallow pan or cup having a handle 32 with a marginal flange corrugated to provide the desired crimping results.

In practice a sheet of dough is placed across the flat upper surface or top of the base board 8. The dough is then sliced into pieces such as will fit down into the pie tins 12. Assuming, therefore, that a piece of dough has been placed in the pie tin, the latter is resting on the ledge 11 and protrudes downwardly through the hole 10. The unit 14 is then placed above the dough and the tin in alignment therewith, as shown for example in Figure 1. Grasping the hand grip 24, the user then forces the former 21 down against the dough pressing it into the pie tin to conform to the shape thereof. The flange on the former meets the flange on the tin and thus provides the desired shaping of the dough. Then, by continuing to force the cup 15 down against the tension of the spring 25, the lip or trimmer 16 comes into play and snips off the surplus dough 17. Now the pie is ready for filling either with fruit or meat as the case may be. After the filling is in place, the overhanging lip of bottom dough is moistened with milk or the like to accommodate the cover. The cover is cut out by using the cutter 28. Then the cover is put in place and the crimper 31 is used to press the marginal edge of the cover against the lip of dough and the properly filled pie tin is removed and placed in the oven for baking.

Figures 8 to 11, inclusive, show modifications of the arrangement. The base 34 which has the form of board similar to that already described is provided with an opening passing therethrough, as indicated at 35, to accommodate the flanged pie tin 36. The depth of the pan is less than the depth of the opening 35, and this obviates the necessity of using spacing blocks 9, as shown in Figure 1. The top of the board is provided with a marginal recess around the opening 35 to provide a ledge for the flange of the pie tin and with the aforementioned annular depression 11 to accommodate the trimmer. Base 34 can be used instead of base 8, in connection, with the unit 14 already described.

The triple-part unit is designated in Figure 8 by the numeral 37. It comprises a T-shaped handle including a hand grip 38 and a tubular stem portion 39. The central part of the handle is provided with a notch 40 permitting access to the wings or finger grips 41 Figure 9 on a nut 42 detachably mounted on the upper threaded end of the former stem or rod 43. The rod passes down through a guide nut 44 which is threaded into the lower end of the tubular stem 39, as shown in Figure 9. This same nut is threadedly connected with the adjacent apertured wall 45 of the inverted cup, 46. The rod 43 is connected at its lower end with the pan-shaped former or shaper 47 and which serves as a support for a spring 48. The former is similar to that already described, except that this modification has a nut 42 which can be pressed up against the tension of the spring 48 and pushed out through the opening 40 to permit the nut to be removed and the former 47 to be detached from the cup 46. The cup is reinforced and held in place by diametrically opposite straps or arms 49. The lower wall or rim of the cup is provided with a cutting flange acting as the trimmer 51. An intervening horizontal web 52 which is corrugated functions as a crimper.

In operation, the parts are assembled as shown in Figures 8 and 9, and the former is forced down against the dough in the pie tin 36 fashioning it as already described. Then in the successive downward movement of the handle and cup arrangement, the trimmer 51 comes into play. When it is desired to use the crimper, the nut 42 is detached and the former 47 is removed. Thus, the cup 46 is given a double function in that it serves not only as a trimmer, but also as a crimper.

A further modification of the invention is shown in Figures 12 to 14. This arrangement embodies the inverted apertured cup 53 whose rim or marginal flange is provided with an outwardly flared cutting lip 54 constituting the cutter or dough trimmer. A T-shaped handle is connected thereto as before. This comprises a tubular hand grip 55 and a tubular central stem 56 at right angles thereto, the stem being provided with diametrically opposite openings 57 permitting access to be had to a nut 58 on the threaded end 59 of the rod 60. This rod is slidable through the assembling and guide nut 61 and is attached, as before, to the shaper or former 62. A coiled spring 63 surrounds the rod having one end bearing against the pan-like former and the opposite end against the assembling and guide nut 61. The complete former unit, generally denoted by the numeral 64 is bodily detachable to accommodate the interchangeable standardized crimper device or unit 65. The latter comprises a shallow cup-like plate 66 having a marginal corrugated annular flange 67 which constitutes the crimper. The rod or stem 68 is threaded as at 69 to accommodate a nut 70 accessible to the finger openings 57. The nut can be held while the unit is moved or a tool can be employed to loosen and remove the nut. It is to be observed that this particular unit 65 includes a marker comprising a disk 71 threaded on the stud 72 and provided with suitable marking spurs or fingers 73. As shown in Figure 14, the fingers are arranged to represent the letter A which, in turn, may designate the word "Apple" for an apple pie. The markers are standardized and interchangeable to function as desired.

The use and operation of the modification of the invention depicted in Figures 12, 13 and 14 is believed to be clear, taking into consideration what has already been shown and described. The main idea is to enable the handle-equipped cup to accommodate either of the devices 64 or 65 whichever is desired for use at the time.

Many changes in the shape, size, and rearrangement of details coming within the field of invention claimed may be resorted to in actual practice, if desired.

Having described the invention, what is claimed as new is:

1. In a structural assemblage of the class described, a combination former and trimmer comprising a forming element, a stem connected centrally to and rising therefrom, a handle having a guide, said stem slidable in said guide, a coiled spring surrounding the stem and interposed between the former element and guide, and a trimmer carried by the handle and arranged to come into play after the former has pressed the dough into the pie tin.

2. A combination former and trimmer comprising a substantially T-shaped handle, the stem portion thereof being hollow, a nut inserted into the stem and constituting a guide, a plunger slidable in said nut, a pan-shaped former attached to the lower end of the plunger, a coiled spring surrounding the plunger and bearing at one end against the former and at its opposite end against the nut, and an inverted dough edge trimmer attached to said stem, in the manner and for the purposes specified.

3. In a structure of the class described, a cup-like member having a trimmer and crimper, a dough former, a rod carrying said former and surrounded by a spring, a handle structure on said cup-like member, and a guide and detachable nut connection between the rod and handle structure, whereby to permit the former to be detached when the crimper is brought into play.

4. As a component part of an assemblage of the class described, an inverted cup-like member including a marginal rim provided with an outstanding annular horizontal flange, said flange being corrugated and constituting a dough crimper, the outer perimeter edge of said flange being provided with a depending annular cutting lip, said lip constituting a dough trimmer, a T-shaped handle, the stem portion thereof being attached to the cup-like member, a guide mounted at the junctural portion of said stem and adjacent part of the cup-like member, a rod slidable through said guide, said rod being screw-threaded at its upper end, a detachable nut carried by the screw-threaded end portion, a pan-like shaper attached to the lower end of said rod, and a coiled spring surrounding the rod and interposed between the former and guide, in the manner and for the purposes described.

5. In a structure of the class described, a cup-like device, a T-shaped handle carried thereby, a hollow stem for said handle the latter being provided with diametrically opposite openings, a guide held within said hollow stem, a dough former provided with a rod slidable through said guide and projectable into the stem portion and provided with a nut, said nut being accessible through the diametrically opposite opening.

6. In a structure of the class described an inverted cup provided with a handle and with an annular cutter, a projectable dough former arranged within said cup and adapted to be moved outwardly through the open side of the cup, a spring pressed member, slidably associated with said inverted cup, carrying the said dough former, said member being adapted to move the said dough former to within the contour of the cup under spring compression and to move it outwardly under spring pressure.

7. A device of the class described comprising a cup-like element provided with a cutter, a T-shaped handle including a hand grip and a tubular stem attached to the central portion of the cup, a guide secured in said tubular stem and said central portion of the cup, a rod slidable in said guide and within said stem, a crimper, consisting of a flanged cup-like plate having a marginal corrugated flange of a diameter smaller than the cup-like element, means to attach said crimper to said rod comprising a threaded stud projecting therefrom and a marker disc carrying projecting spurs adapted to be detachably fixed on said stud below said crimper plate for holding the same.

LORING J. DALE.